(12) United States Patent
Saito et al.

(10) Patent No.: US 9,025,924 B2
(45) Date of Patent: May 5, 2015

(54) OPTICAL FIBER

(71) Applicant: Furukawa Electric Co., Ltd., Tokyo (JP)

(72) Inventors: Minoru Saito, Tokyo (JP); Minoru Kasahara, Tokyo (JP); Kouji Mochizuki, Tokyo (JP); Hiroki Tanaka, Tokyo (JP); Yasuo Nakajima, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 13/956,665

(22) Filed: Aug. 1, 2013

(65) Prior Publication Data
US 2013/0315545 A1 Nov. 28, 2013

Related U.S. Application Data

(63) Continuation of application No. PCT/JP2012/000661, filed on Feb. 1, 2012.

(30) Foreign Application Priority Data

Feb. 4, 2011 (JP) .................. 2011-022588

(51) Int. Cl.
| | |
|---|---|
| *G02B 6/44* | (2006.01) |
| *G02B 6/36* | (2006.01) |
| *G02B 6/02* | (2006.01) |
| *C03C 25/50* | (2006.01) |

(52) U.S. Cl.
CPC ............ *G02B 6/02395* (2013.01); *C03C 25/50* (2013.01); *G02B 6/4403* (2013.01)

(58) Field of Classification Search
USPC .................................................. 385/126–128
See application file for complete search history.

(56) References Cited

U.S. PATENT DOCUMENTS

| 5,259,060 | A | * | 11/1993 | Edward et al. ............... 385/128 |
| 2004/0022512 | A1 | * | 2/2004 | Sato et al. ..................... 385/128 |

FOREIGN PATENT DOCUMENTS

| JP | 2003-096336 | 4/2003 |
| JP | 2006-113103 | 4/2006 |
| JP | 2007-333795 | 12/2007 |

(Continued)

OTHER PUBLICATIONS

International Search Report issued Aug. 15, 2013 in PCT/JP2012/000661 filed Feb. 1, 2012.

(Continued)

*Primary Examiner* — Eric Wong
(74) *Attorney, Agent, or Firm* — Oblon, McClelland, Maier & Neustadt, L.L.P.

(57) ABSTRACT

The present invention provides an optical fiber in which transmission loss is not easily increased when the optical fiber is dipped in water and then dried and also which has a solvent resistant property and a micro-bend resistant property. An optical fiber according to one embodiment of the present invention is an optical fiber in which at least two layers of coating resin coat the circumference of a glass optical fiber. When a Yang's modulus of the first coating layer of the coating resin is defined by PY (MPa) and an elution rate of the coating resin after dipping in 60° C. hot water for 168 hours is defined by E (mass·%), a formula of $1.8 \leq E \leq 8.61 \times PY + 1.40$ is satisfied.

9 Claims, 3 Drawing Sheets

(56) References Cited

FOREIGN PATENT DOCUMENTS

| | | |
|---|---|---|
| JP | 2007-334111 | 12/2007 |
| WO | 2008/029488 | 3/2008 |

OTHER PUBLICATIONS

U.S. Appl. No. 14/309,380, filed Jun. 19, 2014, Tanaka et al.
U.S. Appl. No. 14/296,003, filed Jun. 4, 2014, Kasahara et al.

\* cited by examiner

OPTICAL FIBER

CROSS-REFERENCES TO RELATED APPLICATIONS

This application is a continuation application of International Application No. PCT/JP2012/000661, filed Feb. 1, 2012, which claims the benefit of Japanese Patent Application No. 2011-022588, filed Feb. 4, 2011. The contents of the aforementioned applications are incorporated herein by reference in their entireties.

TECHNICAL FIELD

The present invention relates to an optical fiber, and particularly relates to an optical fiber placed within an optical fiber cable.

BACKGROUND ART

Recently, according to the progress in FTTH (Fiber to The Home), it is required to improve a micro-bend resistant property of an optical fiber in order to reduce transmission loss in the optical fiber.

The transmission loss in the optical fiber is increased by various kinds of external stress and micro-bend generated thereby. In order to protect the optical fiber from the external stress, generally in the optical fiber, a glass optical fiber is provided with a resin coating having a two-layers structure. Here, the optical fiber in which the glass optical fiber is provided with any coating is called an optical fiber.

There is disclosed an optical fiber, as the optical fiber having a coating layer of a two-layer structure, in which a water extractable rate of coating resin of the optical fiber is not larger than 1.5 mass·% after the optical fiber has been immersed in hot water of 60° C. for 68 hours (refer to patent literature 1).

Further, there is disclosed an optical fiber having a coated layer in which saturation charge voltage of the coated layer of the optical fiber is 0.2 kV to 0.7 kV and also a weight change rate thereof in a hot water immersion test at 60° C. is smaller than 3 weight·% to a weight before the immersion (refer to patent literature 2). Moreover, there is disclosed that, in a colored optical fiber having a colored layer, the colored layer is formed by a resin having a water extractable rate which is not larger than 3·% after having been immersed in hot water of 60° C. for 30 days, and a Young's modulus of the first coating layer in the colored optical fiber is not smaller than 0.5 MPa and not larger than 10 MPa (refer to patent literature 3).

CITATION LIST

Patent Literature

PTL 1: Domestic republication of PCT international application No. 2008-029488
PTL 2: Japanese Patent Application Laid-Open No. 2003-96336
PTL 3: Japanese Patent Application Laid-Open No. 2006-113103
PTL 4: Japanese Patent Application Laid-Open No. 2007-333795

SUMMARY OF INVENTION

Figure 6:
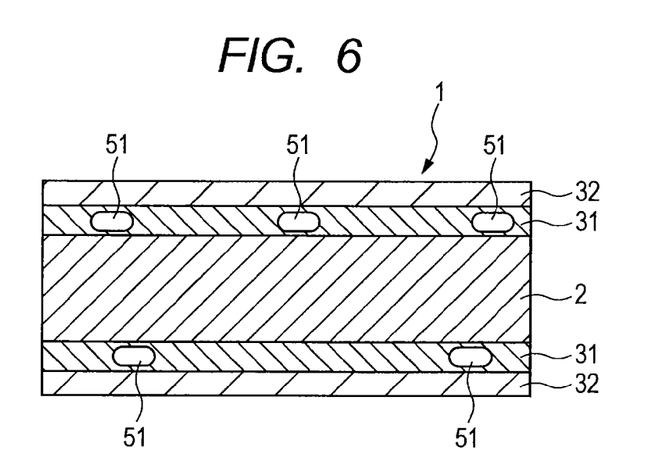
FIG. 6 is a cross-sectional view for explaining a void generated in the first coating layer of a conventional optical fiber.

For improving the micro-bend resistant property, it is effective to reduce the Young's modulus of the first coating layer, but, when an optical fiber coated by the first coating layer having a low Young's modulus is immersed in water and then dried, a void 51 is generated partially in the first coating layer 31 as shown in FIG. 6, and the transmission loss of the optical fiber 1 is sometimes increased. Here, the second coating layer 32 is formed outside the first coating layer 31, and the optical fiber 1 is provided with a glass optical fiber 2, the first coating layer 31, and the second coating layer 32.

Further, generally work of connecting optical fibers with each other and work of attaching a connector include work of cleaning the surface or the end plane of the optical fiber with solvent. Particularly in a cable having a structure in which waterproofing jelly or the like is filled, when the jelly is removed from the surface of the optical fiber, the optical fiber is exposed to solvent (mainly, ethanol) for long hours. Therefore, the optical fiber is required to have a solvent resistant property.

The present invention has been achieved in view of the above and aims to provide an optical fiber in which transmission loss is not easily increased when the optical fiber is immersed in water and then dried, and also which has a solvent resistant property and a micro-bend resistant property.

An aspect of the present invention is an optical fiber comprising coating resin which is provided on the circumference of a glass optical fiber and in which at least two coating layers are stacked, wherein, when a Young's modulus of the first coating layer provided on the nearest side of the glass optical fiber out of the at least two coating layers is defined by PY (MPa), and a water extractable rate of the coating resin after the optical fiber has been immersed in hot water of 60° C. for 168 hours is defined by E (mass·%), following formulas:

$$PY \leq 0.55 \text{ MPa; and}$$

$$1.8 \leq E \leq 8.61 \times PY + 1.40$$

are satisfied.

According to the present invention, it is possible to provide an optical fiber in which transmission loss is not easily increased when the optical fiber is immersed in water and then dried, and also which has a solvent resistant property and a micro-bend resistant property.

DESCRIPTION OF EMBODIMENTS

There will be explained a preferred embodiment for an optical fiber of the present invention according to FIG. 1.

Figure 1:
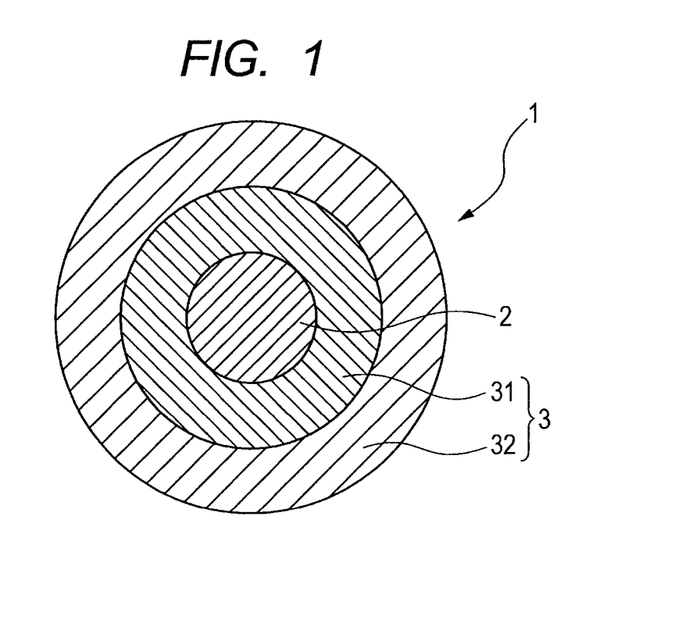
FIG. 1 is a cross-sectional view showing an optical fiber according to one embodiment of the present invention.

As shown in FIG. 1, an optical fiber 1 is configured with a glass optical fiber 2 which is made of silica glass and coated by at least two layers of coating resin 3. The first coating layer 31 of the coating resin 3 has a Young's modulus PY not larger than 0.55 MPa, and also, when a water extractable rate of the coating resin 3 after the optical fiber 1 has been immersed in hot water of 60° C. for 168 hours is defined by E (mass·%), the water extractable rate E of the above coating resin satisfies following formula (1). Further, the lower limit of the Young's modulus PY is preferably not smaller than 0.1 MPa and more preferably not smaller than 0.14 MPa from a viewpoint of durability in the first coating layer against external force such as side pressure and squeezing or the like which is applied in handling.

[Formula 1]

$$1.8 \leq E \leq 8.61 \times PY + 1.40 \tag{1}$$

The relationship of $E \leq 8.61 \times PY + 1.40$ in above formula (1) is derived from a study of a relationship between whether a void is generated or not in the first coating layer 31 when the optical fiber 1 is dried after the immersion and the Young's modulus PY and the water extractable rate E of the first coating layer 31. While details will be described below, void generation is suppressed when the water extractable rate E satisfies the relationship of $E \leq 8.61 \times PY + 1.40$. Further, an excellent solvent resistant (ethanol resistant) property is obtained when the relationship of $1.8 \leq E$ in above formula (1) is satisfied. Moreover, when a relationship of $PY \leq 0.55$ MPa is satisfied, a sufficient elasticity is provided for the first coating layer 31, and thereby micro-bend generation is suppressed even when external force is applied to the optical fiber 1 and an excellent micro-bend resistant property is obtained.

Further, for the second coating layer 32 of the coating resin 3, there is used a coating layer having a Young's modulus of 500 MPa to 1,500 MPa. In this manner, by means of setting the Young's modulus of the second coating layer 32 to be high, a sufficient mechanical strength required for the optical fiber 1 is provided.

For the above described coating resin 3, there is mainly used an ultraviolet curable resin. The ultraviolet curable resin includes an oligomer, a diluent monomer, and an additive. Examples of the additive include a photo-initiator, an oxidation inhibitor, a chain transfer agent, a light stabilizer, a plasticizer, a colorant, a polymerization inhibitor, a sensitizer, a lubricant, and the like. For the oligomer, an urethane acrylate resin, an epoxy acrylate resin, or polyester a acrylate resin are mainly used. As the diluent monomer, there is used monofunctional acrylate, multi-functional acrylate, or a vinyl monomer such as N-vinyl-pyrrolidone and N-vinyl-caprolactam.

The Young's modulus of the coating resin 3 can be adjusted by a molecular weight of the oligomer and a kind of the diluent monomers. That is, as the oligomer molecular weights is increased, and as the number of mono-functional monomers is made larger than that of multi-functional monomers for the diluent monomers, cross-link density becomes low and a coating resin having a low Young's modulus is obtained. Accordingly, in the first coating layer 31, by means of using the oligomer having a number averaged molecular weight of 500 to 10,000 and making a composition ratio of the mono-functional monomer higher than that of the multi-functional monomer for the diluent monomer, the cross-link density is reduced and a low Young's modulus preferably not larger than 0.55 MPa and more preferably not larger than 0.50 MPa is obtained. On the other side, in the second coating 32, by means of making the composition rate of the multi-functional monomer higher than that of the mono-functional monomer for the diluent monomer, the cross-link density is increased and a high Young's modulus not smaller than 500 MPa and not larger than 1,500 MPa is obtained. In the present specification, a monomer having one double bond (>C=C<) of a reactive group in one molecule is called the mono-functional monomer and a monomer having two or more double bonds is called the multi-functional monomer.

Further, non-reactive additive such as the oxidation inhibitor and the chain transfer agent become water extractable components, and therefore a resin water extractable amount can be adjusted by composition ratios thereof. That is, as the composition ratios of the non-reactive additives are increased, the resin water extractable amount can be increased. Further, water extractable easiness in water immersion is affected by, for example, compatibility between these non-reactive additives and a molecular structure of a cross-link part. That is, a strong electrostatic attractive force is generated between functional groups each having a high polarity such as a hydroxyl group and ester, and therefore, when the non-reactive additive has a structure of a high polarity and a coating layer having a structure of a low polarity in the cross-link part is immersed in water, the electrostatic attractive force between the non-reactive additives and a water molecule is weakened and the water extractable amount is increased. On the other hand, when the cross-link part has a high polarity, the water extractable amount is reduced.

When a cross-linking reaction inhibitor such as the chain transfer agent is used, the cross-link density can be reduced and thereby the first coating layer 31 is caused to have a low Young's modulus, but, on the other side, low molecular weight components are easily generated as a by-product and the water extractable component is increased. Accordingly, in consideration of the above, the Young's modulus in each of the first coating layer 31 and the second coating layer 32 and an amount and a kind of the water extractable components can be adjusted optionally, by the oligomer molecular weight, the kind of the diluent monomers, the composition amount of the chain transfer agent, and the like.

According to the optical fiber 1 of the present embodiment, the first coating layer 31 uses the resin having a Young's modulus PY preferably not larger than 0.55 MPa, and more preferably not larger than 0.50 MPa, and thereby the micro-bend generation is suppressed and an excellent micro-bend resistant property is obtained.

Further, the formula of $E \leq 8.61 \times PY + 1.40$ is satisfied, and thereby the void is not easily generated in the first coating layer 31 when the optical fiber 1 is immersed in water and then dried.

The water extractable component from the coating resin 3 of the optical fiber 1 come from the first coating layer 31 which has a low cross-link density. Accordingly, as the water extractable rate E is higher, a volume reduction amount is increased in the first coating layer 31. Although the first coating layer 31 absorbs water during the water immersion and this volume change provides little influence, after drying, the above volume reduction which is caused by this water extractable component generates tensile stress in the first coating layer 31. Accordingly, as the water extractable rate E becomes higher, the tensile stress generated in the drying is increased and the void is easily generated. Further, as the cross-link density becomes lower, that is, the Young's modulus is reduced, the first coating layer 31 comes to have a weaker tensile strength, and thereby the void is easily generated.

Further, since the relationship of 1.8≤E is satisfied, an excellent solvent resistant property (ethanol resistant property) is obtained.

The optical fiber 1 was immersed in ethanol for one hour as a solvent resistant property test of the optical fiber 1 and appearance change was observed, and it was found that coating abnormality such as a crack and a tear was not caused in the coating resin 3 if the water extractable rate E was not lower than 1.8 mass·% after the immersion in hot water of 60° C. for 168 hours. This is because of the following. That is, in the ethanol immersion, ethanol penetrates the coating resin 3 of the optical fiber 1 and the coating resin 3 swells. When the swelling becomes significantly large, the coating resin 3 is broken and a crack or a tear is caused. However, the optical fiber 1 having a high water extractable rate E includes a lot of non-cross-link components having a low molecular weight in the coating resin 3, and these low molecular weight components move out of the coating layer in the ethanol immersion. Thereby, the swelling of the coating resin 3 is suppressed.

Further, when the Young's modulus PY of the first coating layer 31 is constant, the void is more easily generated as the water extractable rate E of the coating resin 3 is higher during the immersion.

As described above, when the Young's modulus of the first coating layer 31 is defined by PY and the water extractable rate E (mass·%) of the coating resin 3 is in a range satisfying E≤8.61×PY+1.40 of above described formula (1), the void (air gap) generation is suppressed after the immersion and succeeding drying. Accordingly, the transmission loss is not easily increased and also, in a range satisfying 1.8≤E of above described formula (1), the optical fiber 1 having an excellent solvent resistant property can be obtained.

Next, there will be explained another preferable embodiment for an optical fiber of the present embodiment according to FIG. 2.

Figure 2:
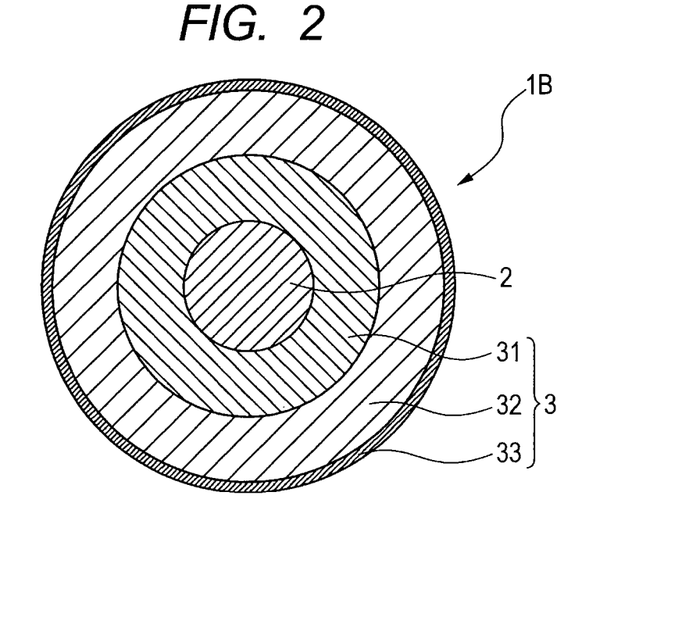
FIG. 2 is a cross-sectional view showing an optical fiber according to one embodiment of the present invention.

As shown in FIG. 2, in an optical fiber 1B, the glass optical fiber 2 is coated by a coating resin 3 including three layers of the first coating layer 31, the second coating layer 32, and a colored layer 33. Ultraviolet curable resin is used for each of the resin layers. The ultraviolet curable resin includes the oligomer, the diluent monomer, the photo initiator, the chain transfer agent, the additive, and the like, and, by means of changing constituent materials thereof, a coating layer having a desired Young's modulus PY and water extractable rate E can be obtained. The water extractable rate E of this case is defined as a water extractable rate of the whole coating resin including the colored layer 33. Further, the outer diameter of the glass optical fiber 2 is assumed to be 125 μm, the outer diameter of the first coating layer 31 is assumed to be 195 μm, the outer diameter of the second coating layer 32 is assumed to be 245 μm, and the outer diameter of the colored layer 33 is assumed to be 255 μm. These values are examples and can be changed optionally. Accordingly, the optical fiber 1B has the same configuration as the optical fiber 1 of the above described first embodiment except the colored layer 33. The optical fiber 1B having such a configuration is also called a colored optical fiber.

Next, there will be explained a preferable embodiment for an optical fiber ribbon of the present invention according to FIG. 3.

Figure 3:
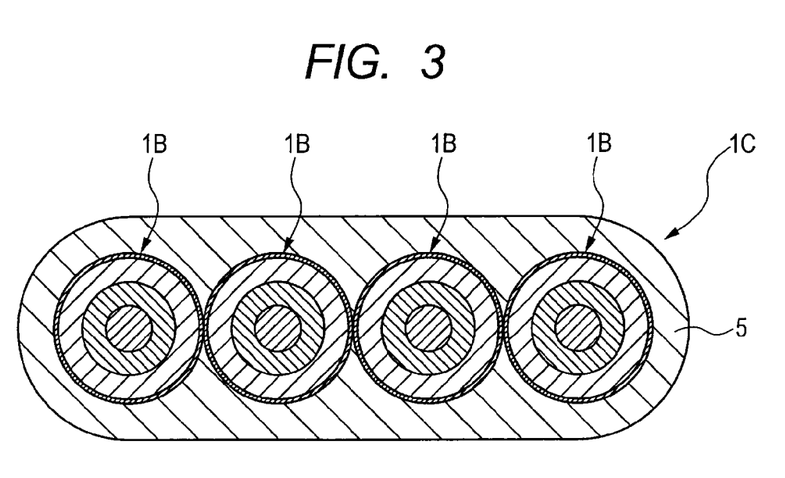
FIG. 3 is a cross-sectional view showing an optical fiber ribbon according to one embodiment of the present invention.

As shown in FIG. 3, an optical fiber ribbon according to an embodiment of the present invention may have a configuration in which four optical fibers 1B each described above are arranged in parallel to have a planar shape and a coating layer 5 made of the ultraviolet curable resin coats the optical fibers 1B arranged in parallel to form the optical fiber ribbon 1C. In this case, by separating the optical fiber ribbon 1C into each fibers, it is possible to measure the water extractable rate for both colored resin and coating resin of the optical fiber.

Also in the optical fiber 1B for the above described optical fiber 1B and the optical fiber ribbon 1C, as the optical fiber 1, the first coating layer 31 of the coating resin 3 has a Young's modulus PY not larger than 0.55 MPa and also the water extractable rate E (mass·%) of the coating resin 3 satisfies above described formula (1) when the optical fiber 1 is immersed in hot water of 60° C. for 168 hours.

Accordingly, as the optical fiber 1, the optical fibers 1B and 1C can suppress the void generation when the water extractable rate E satisfies the relationship of E≤8.61×PY+1.40 in above described formula (1). Further, when the relationship of 1.8≤E in above formula (1) is satisfied, an excellent solvent resistant (ethanol resistant) property is obtained. Further, when the relationship of PY≤0.55 is satisfied, an excellent micro-bend resistant property is obtained.

EXAMPLE

In the following, there will be explained an example of the optical fiber explained in each of the above described embodiments.

For the configuration of the optical fiber 1 as described above, optical fibers 1 in which the Young's moduli of the first coating layers 31 and the water extractable rates of the coating resins 3 were different from one another were fabricated, and whether the void was generated or not, the solvent resistant property, and the micro-bend resistant property were studied.

For the fabrication of the optical fiber samples, a glass optical fiber having an outer diameter (diameter) of approximately 125 μm was used as a glass optical fiber 2, and the first coating layer 31 was formed on the circumference thereof and further the second coating layer 32 was formed on the circumference thereof to fabricate the optical fiber 1. The outer diameter of the first coating layer 31 was 195 μm, and the outer diameter of the second coating layer 32 was 245 μm. These values are examples and can be changed optionally.

The urethane-acrylate type ultraviolet curable resin was used as the resin materials for both of the first coating layer 31 and the second coating layer 32, and each of the Young's moduli in the first coating layer 31 and the second coating layer 32 and the water extractable rate of the coating resin 3 were adjusted optionally by the oligomer molecular weight, the kind of the diluent monomers, the composition amount of the chain transfer agent, and the like.

Next, there will be explained each test method for whether the void is generated or not, the solvent resistant property, and the micro-bend resistant property.

1. Void Test

The optical fibers 1 in which the Young's moduli PY of the first coating layers 31 and the water extractable rates E of the coating resin 3 were different from one another were taken out after immersion in hot water of 60° C. for a predetermined time, dried for one day (24 hours), and then observed with a microscope. In the microscope observation, a case in which the void was observed in the first coating layer 31 was determined to be x, and a case in which the void was not observed was determined to be o. Here, in this test, the water extractable rate was changed by means of changing a immersion time in some ways for the same optical fiber.

The Young's modulus PY of the above first coating layer 31 was measured by an ISM (In Situ Modulus) test method described in patent literature 4 and the like.

Figure 4:
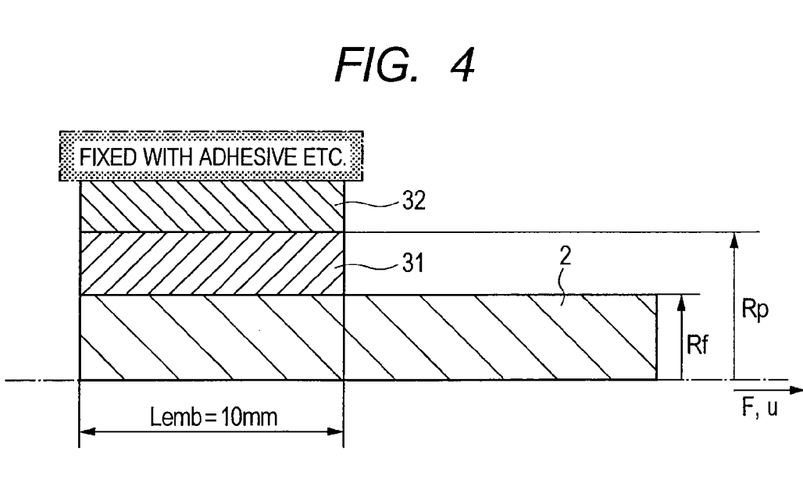
FIG. 4 is a cross-sectional view of an optical fiber for explaining an ISM test method for measuring a Young's modulus of the first coating layer according to one embodiment of the present invention.

Specifically, as shown in FIG. 4, a certain length (10 mm) of the coated glass fiber is glued, while the coating is stripped from the non-embedded part of the fiber. Under a temperature of 23° C., a force was applied gradually so as to pull out the glass optical fiber 2 in the direction where the coated part was not fixed, and a displacement of the glass optical fiber 2 was measured. When the force applied to the glass optical fiber 2 in the unfixed end is defined by F, the displacement of the glass optical fiber 2 is defined by u, the radius of the glass optical fiber 2 is defined by Rf, the radius of the first coating layer 31 is defined by Rp, the length of the part where the coating was left (10 mm in this case) is defined by Lemb, a shear elastic modulus Gp of the first coating layer 31 is calculated by the use of following formula (2).

[Formula 2]

$$Gp = \frac{F \cdot \ln(Rp/Rf)}{2\pi Lemb \cdot u} \qquad (2)$$

When a Poisson's ratio is defined by ν and a Young's modulus is defined by PY, there exists a relationship of PY=2 (1+ν)×Gp. Here, the first coating layer 31 is assumed not to have a volume change caused by the expansion and the Poisson's ratio ν is determines to 0.5. Accordingly, the Young's modulus PY of the first coating layer 31 becomes 3 Gp.

The above described water extractable rate E was measured by the following method.

The optical fiber 1 having a length of 5 m was kept in a constant temperature room for 34 hours at 23° C. and 50·% RH (RH is relative humidity and is a value of a moisture amount included in air at some temperature divided by a saturated moisture amount at this temperature (unit is %)), and then the mass (w1) of the coating resin 3 part was measured by means of subtracting the mass of the glass optical fiber 2 from the mass of the optical fiber 1. Next, the optical fiber 1 was immersed in water heated to 60° C. for 168 hours, and then taken out from the hot water and dried at 60° C. for 24 hours. After that, the mass of the coating resin 3 part (W2) was measured. The water extractable rate E (mass·%) was obtained from the measured values of w1 and w2 by following formula (3).

[Formula 3]

$$E=(w1-w2)/w1\times100 \qquad (3)$$

2. Solvent Resistant Property Test of the Optical Fiber

In a solvent resistant property test of the optical fiber, the optical fiber 1 having a length of 10 cm was immersed in ethanol for one hour and then appearance change was observed with a microscope, and a case in which the coating resin 3 did not change is determined to be o and a case in which coating abnormality such as a crack and a tear was caused is determined to be x.

3. Micro-Bend Resistant Property Test of the Optical Fiber

For the micro-bend resistant property of the optical fiber 1, a sand paper of No. 1,000 defined by JIS was pasted onto the body part of a plastic bobbin (outer diameter: 28 cm), and the optical fiber 1 was wound thereon with a winding tensile force of 100 g to form one layer (approximately 500 m). Then, the transmission loss (L1) was measured at a measurement wavelength of 1550 nm by a cut-back method within 30 minutes from the winding. On the other side, the transmission loss (L2) was measured for the same optical fiber 1 in a bundle state (approximately 1,000 m in a state without being wound on a bobbin) at a measurement wavelength of 1550 nm by the same cut-back method.

The cut-back method is a method of obtaining a loss from a difference between an output from an experimental optical fiber 1 and an output after the experimental optical fiber 1 has been cut in a cut-back length (e.g., 2 m). Thereby, a loss at a connection point between the experimental optical fiber 1 and a testing apparatus is subtracted and an accurate loss can be measured for the glass optical fiber 2 of the experimental optical fiber 1.

Then, a value of L1−L2 was calculated and this value was determined to be a loss increase amount. A case in which this value was not larger than 0.5 dB/km was determined to be o and a case in which the loss was larger than 0.5 dB/km was determined to be x. Here, when the above described loss increase amount is not larger than 0.5 dB/km, an optical fiber cable using this optical fiber can be used preferably for a communication cable and the like.

Examples 1 to 6

In example 1 (sample No. 2), the urethane acrylate series ultraviolet curable resin was used for the first coating layer 31 and the second coating layer 32, and, for each of the Young's moduli in the first coating layer 31 and the second coating layer 32 and the water extractable rate of the coating resin 3, the Young's modulus PY of the first coating layer 31 was adjusted to 0.14 MPa and the water extractable rate E of the coating resin 3 after the immersion in 60° C. hot water for 168 hours was adjusted to 2.4 mass·%, by means of adjusting the oligomer molecular weight, the kind of the diluent monomers, and the composition amount of the chain transfer agent, and the like. Here, the reason for the 168 hours is that the water extractable from the coating resin is almost saturated after elapse of 168 hours.

Example 2 (sample No. 3) is the same as above described example 1 except that the Young's modulus PY of the first coating layer 31 was adjusted to 0.2 MPa and the water extractable rate E of the coating resin 3 after the immersion in 60° C. hot water for 168 hours was adjusted to 1.8 mass·%, by means of adjusting the oligomer molecular weight, the kind of the diluent monomers, the composition amount of the chain transfer agent, and the like.

Example 3 (sample No. 6) is the same as above described example 1 except that the Young's modulus PY of the first coating layer 31 was adjusted to 0.22 MPa and the water extractable rate E of the coating resin 3 after the immersion in 60° C. hot water for 168 hours was adjusted to 2.9 mass·%, by means of adjusting the oligomer molecular weight, the kind of the diluent monomers, the composition amount of the chain transfer agent, and the like.

Example 4 (sample No. 12) is the same as above described example 1 except that the Young's modulus PY of the first coating layer 31 was adjusted to 0.33 MPa and the water extractable rate E of the coating resin 3 after the immersion in 60° C. hot water for 168 hours was adjusted to 3.8 mass·%, by means of adjusting the oligomer molecular weight, the kind of the diluent monomers, the composition amount of the chain transfer agent, and the like.

Example 5 (sample No. 15) is the same as above described example 1 except that the Young's modulus PY of the first coating layer 31 was adjusted to 0.49 MPa and the water extractable rate E of the coating resin 3 after the immersion in 60° C. hot water for 168 hours was adjusted to 4.4 mass·%, by means of adjusting the oligomer molecular weight, the kind of the diluent monomers, the composition amount of the chain transfer agent, and the like.

Example 6 (sample No. 16) is the same as above described example 1 except that the Young's modulus PY of the first coating layer 31 was adjusted to 0.50 MPa and the water extractable rate E of the coating resin 3 after the immersion in 60° C. hot water for 168 hours was adjusted to 3.8 mass·%, by means of adjusting the oligomer molecular weight, the kind of the diluent monomers, the composition amount of the chain transfer agent, and the like.

Comparison Examples 1 to 3

Comparison example 1 (sample No. 18) is the same as above described example 1 except that the Young's modulus PY of the first coating layer 31 was adjusted to 0.60 MPa and the water extractable rate E of the coating resin 3 after the immersion in 60° C. hot water for 168 hours was adjusted to 1.5 mass·%, by means of adjusting the oligomer molecular weight, the kind of the diluent monomers, the composition amount of the chain transfer agent, and the like.

Comparison sample 2 (sample No. 19) is the same as above described example 1 except that the Young's modulus PY of the first coating layer 31 was adjusted to 0.81 MPa and the water extractable rate E of the coating resin 3 after the immersion in 60° C. hot water for 168 hours was adjusted to 1.8 mass·%, by means of adjusting the oligomer molecular weight, the kind of the diluent monomers, the composition amount of the chain transfer agent, and the like.

Comparison example 3 (sample No. 20) is the same as above described example 1 except that the Young's modulus PY of the first coating layer 31 was adjusted to 0.95 MPa and the water extractable rate E of the coating resin 3 after the immersion in 60° C. hot water for 168 hours was adjusted to 1.4 mass·%, by means of adjusting the oligomer molecular weight, the kind of the diluent monomers, the composition amount of the chain transfer agent, and the like.

Figure 5:
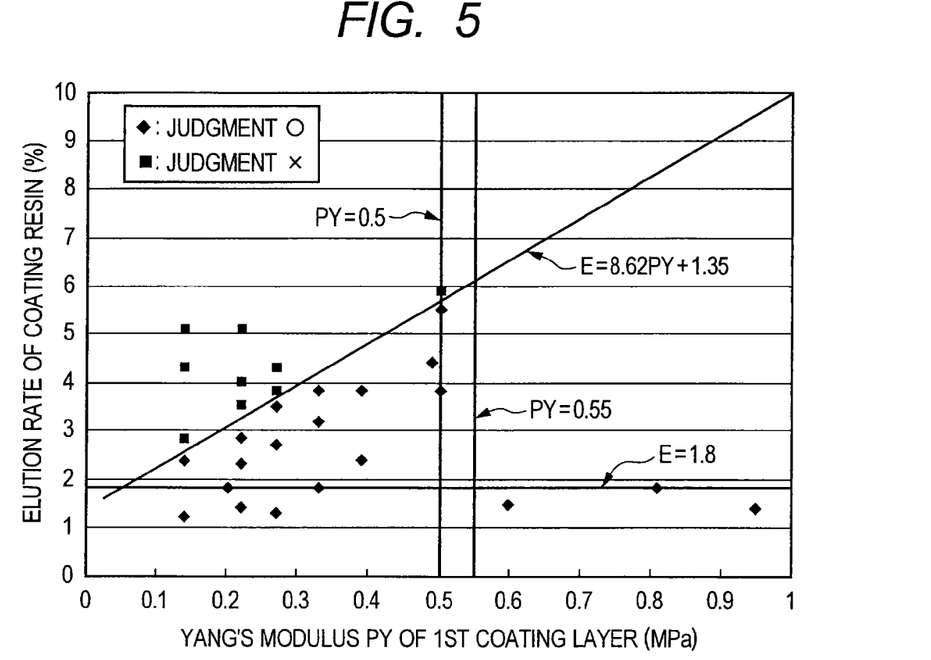
FIG. 5 is a diagram showing a test result about whether a void is generated or not, which is obtained from a relationship between a water extractable rate of coating resin E and a Young's modulus PY of the first coating layer, according to one embodiment of the present invention.

A test result about whether the void was generated or not is shown in FIG. 5 and following table 1. Table 1 shows a measurement value of a measurement point of FIG. 5. In a measurement item of "whether the void was generated or not", a case in which the void was not generated is shown by o and a case in which the void was generated is shown by x. Further, in FIG. 5, a measurement point shown by a black diamond shape indicates a case in which the void was not generated (test result o) and a measurement point shown by a black square indicates a case in which the void was generated (test result x).

From FIG. 5, it is found that, as the water extractable rate E of the coating resin 3 becomes higher and the Young's modulus PY of the first coating layer 31 becomes lower, the void is easily generated. Further, it is found that, when the Young's modulus of the first coating layer 31 is defined by PY and the water extractable rate E of the coating resin 3 is in a range of $E \leq 8.61 \times PY + 1.40$ in above described formula (1), the void is not generated.

The right side of above described formula (1) was obtained as follows.

A gradient and a constant term was obtained for a line connecting a point providing a water extractable rate of 2.4 mass·%, at a Young's modulus of 0.14 MPa and a point providing a water extractable rate of 5.5 mass·% at a Young's modulus of 0.5 MPa, which water extractable rates are upper limit values without causing the void. The slope is 8.61 and the constant term is 1.20. Further, a slope and a constant term was obtained for a line connecting a point providing a water extractable rate of 2.8 mass·% at a Young's modulus of 0.14 MPa and a point providing a water extractable rate of 5.9 mass·% at a Young's modulus of 0.5 MPa, which water extractable rates are lower limit values causing the void. The slope is 8.61 and the constant term is 1.59. By the use of the middle of these values, the slope was determined to be 8.61 and the constant term was determined to be 1.40, and thereby above described formula of $E \leq 8.61 \times PY + 1.40$ was derived.

TABLE 1

| Sample No. | Young's modulus of 1st coating layer (MPa) | Water extractable rate (%) | Void is generated or not |
|---|---|---|---|
| 1 | 0.14 | 1.2 | o |
| 2 | 0.14 | 2.4 | o |
| 3 | 0.2 | 1.8 | o |
| 4 | 0.22 | 1.4 | o |
| 5 | 0.22 | 2.3 | o |
| 6 | 0.22 | 2.9 | o |
| 7 | 0.27 | 1.3 | o |
| 8 | 0.27 | 2.7 | o |
| 9 | 0.27 | 3.5 | o |
| 10 | 0.33 | 1.8 | o |
| 11 | 0.33 | 3.2 | o |
| 12 | 0.33 | 3.8 | o |
| 13 | 0.39 | 2.4 | o |
| 14 | 0.39 | 3.8 | o |
| 15 | 0.49 | 4.4 | o |
| 16 | 0.5 | 3.8 | o |
| 17 | 0.5 | 5.5 | o |
| 18 | 0.6 | 1.5 | o |
| 19 | 0.81 | 1.8 | o |
| 20 | 0.95 | 1.4 | o |
| 21 | 0.14 | 2.8 | x |
| 22 | 0.14 | 4.3 | x |
| 23 | 0.14 | 5.1 | x |
| 24 | 0.22 | 3.5 | x |
| 25 | 0.22 | 4.0 | x |
| 26 | 0.22 | 5.1 | x |
| 27 | 0.27 | 3.8 | x |
| 28 | 0.27 | 4.3 | x |
| 29 | 0.5 | 5.9 | x |

Further, test conditions and results of above described examples 1 to 6 and above described comparison examples 1 to 3 are shown in table 2.

Moreover, a result of the solvent resistant property test is shown in following table 2.

From table 2, it is found that, when the water extractable rate E obtained after the immersion in 60° C. hot water for 168 hours and succeeding drying for 24 hours is not lower than 1.8 mass·% as in examples 1 to 6 and comparison example 2, the solvent resistant property can be obtained (test result o).

Further, a result of the micro-bend resistant property test is shown in table 2.

From table 2, it is found that, when the Young's modulus PY of the first coating layer 31 is not larger than 0.55 MPa and more preferably not larger than 0.5 MPa as in examples 1 to 6, the micro-bend resistant property can be obtained (test result o).

TABLE 2

| | Young's modulus of 1st coating layer (MPa) | Water extractable rate after immersion at 60° C. and for 168 hours (mass · %) | Void test | Solvent resistant property test | Micro-bend resistant property test | Overall judgment |
|---|---|---|---|---|---|---|
| Example 1 | 0.14 | 2.4 | o | o | o | o |
| Example 2 | 0.2 | 1.8 | o | o | o | o |
| Example 3 | 0.22 | 2.9 | o | o | o | o |
| Example 4 | 0.33 | 3.8 | o | o | o | o |
| Example 5 | 0.49 | 4.4 | o | o | o | o |
| Example 6 | 0.5 | 3.8 | o | o | o | o |

TABLE 2-continued

| | Young's modulus of 1st coating layer (MPa) | Water extractable rate after immersion at 60° C. and for 168 hours (mass · %) | Void test | Solvent resistant property test | Micro-bend resistant property test | Overall judgment |
|---|---|---|---|---|---|---|
| Comparison example 1 | 0.6 | 1.5 | o | x | x | x |
| Comparison example 2 | 0.81 | 1.8 | o | o | x | x |
| Comparison example 3 | 0.95 | 1.4 | o | x | x | x |

Accordingly, there is obtained an overall judgment that, when the Young's modulus PY of the first coating layer 31 satisfies a condition of PY≤0.55 MPa and also the water extractable rate E of the coating resin 3 satisfies above described formula (1), the void is not generated and the micro-bend resistant property and the solvent resistant property are excellent (judgment result o).

The invention claimed is:

1. An optical fiber comprising:
    a glass optical fiber; and
    at least two coating layers provided on the circumference of the glass optical fiber, the at least two coating layers being stacked and comprising a first coating layer provided on the nearest side to the glass optical fiber among the at least two coating layers,
    the at least two coating layers each comprising a coating resin which is obtained by curing a resin composition by a ultraviolet ray, the resin composition comprising: an oligomer; a diluent monomer; and a non-reactive additive,
    the at least two coating layers being configured by adjusting at least one of a molecular weight of the oligomer, a kind of the diluent monomer, an amount of the non-reactive additive in the resin composition such that when a Young's modulus of the first coating layer is defined by PY (MPa), and a water extractable rate of the coating resin after the optical fiber has been immersed in water of 60° C. for 168 hours is defined by E (mass·%), formulas:

$PY \leq 0.55$ MPa; and $1.8 \leq E \leq 8.61 \times PY + 1.40$ are satisfied.

2. The optical fiber according to claim 1, wherein a coating layer on the outermost side of the at least two coating layers is a colored layer comprising colored resin.

3. An optical fiber ribbon, comprising:
    a plurality of optical fibers arranged in parallel, each of the plurality of optical fibers being the optical fiber according to claim 2; and
    a coating layer coating the plurality of optical fibers.

4. The optical fiber according to claim 1, wherein the at least two coating layers are configured such that formula:

$0.1$ MPa $\leq PY \leq 0.55$ MPa is satisfied.

5. The optical fiber according to claim 1, wherein the at least two coating layers are configured such that formula:

$0.14$ MPa $\leq PY \leq 0.55$ MPa is satisfied.

6. The optical fiber according to claim 1, wherein the non-reactive additive comprises at least one of an oxidation inhibitor and a chain transfer agent.

7. The optical fiber ribbon according to claim 3, wherein the at least two coating layers are configured such that formula:

$0.1$ MPa $\leq PY \leq 0.55$ MPa is satisfied.

8. The optical fiber ribbon according to claim 3, wherein the at least two coating layers are configured such that formula:

$0.14$ MPa $\leq PY \leq 0.55$ MPa is satisfied.

9. The optical fiber ribbon according to claim 3, wherein the non-reactive additive comprises at least one of an oxidation inhibitor and a chain transfer agent.

* * * * *